United States Patent [19]

Schmuckler

[11] Patent Number: 4,885,143

[45] Date of Patent: Dec. 5, 1989

[54] METHOD FOR THE INTERSEPARATION OF PLATINUM GROUP METALS

[75] Inventor: Gabriella Schmuckler, Haifa, Israel

[73] Assignee: Technion Research and Development Foundation Ltd., Haifa, Israel

[21] Appl. No.: 220,384

[22] Filed: Jul. 12, 1988

[30] Foreign Application Priority Data

Aug. 6, 1987 [IL] Israel .......................................... 83449

[51] Int. Cl.[4] ............................................. C22B 11/04
[52] U.S. Cl. ............................................ 423/22; 423/24; 423/DIG. 14; 210/635; 210/656; 210/688; 75/101 BF; 75/118 R; 75/121
[58] Field of Search .................... 423/22, 24, DIG. 14; 75/101 BE, 118 R, 121; 210/688, 635, 656

[56] References Cited

U.S. PATENT DOCUMENTS 2,714,555 8/1955 Stevenson et al. ..................... 423/22
3,970,553 7/1976 Terajima et al. ....................... 423/25

FOREIGN PATENT DOCUMENTS 0007256 4/1979 Japan ..................................... 423/22
0151435 9/1983 Japan ..................................... 423/22
2275024 11/1987 Japan ..................................... 423/22

Primary Examiner—Robert L. Stoll
Attorney, Agent, or Firm—Browdy and Neimark

[57] ABSTRACT

A method for the interseparation of platinum-group noble metals (PGMs) from a gold-free halide solution using at least one chromatographic column. The solution is passed through a column containing a solid absorbent having a Kd above 1 whereby the PGMs are absorbed. The loaded absorbent is eluted by a halide salt solution obtaining thereby well-spaced fractions, each containing only one single noble metal, coming out in the order: Ru, Rh, Pd, Pt, Ir and Cs. When gold is present with the PGMs, its prior removal is required by an additional chromatographic column containing an absorbent based on polystyrene divinyl.

9 Claims, 3 Drawing Sheets

SEPARATION OF SIX PLATINUM GROUP METAL IONS (Example 2)

INTERSEPARATION OF PALLADIUM, PLATINUM & IRIDIUM (Example I)

FIG.2 SEPARATION OF SIX PLATINUM GROUP METAL IONS (Example 2)

CHROMATOGRAM OF Cr, Ni, Cu, Pt & Pd (Example 3)

METHOD FOR THE INTERSEPARATION OF PLATINUM GROUP METALS

FIELD OF THE INVENTION

The present invention relates to an improved method for the separation of noble metals from base metals present in a solution. More particularly, the invention relates to an improved method for the interseparation of noble metals present in a solution, in a very pure form.

BACKGROUND OF THE INVENTION

It is known that mixtures of different combinations of the noble metals: platinum, palladium, iridium, rhodium, ruthenium and osmium—collectively named the platinum-group metals or PGMs (hereinafter so named-)—with or without gold, in different combinations are often present in ores, either all together or only in part. Gold, platinum and palladium are leached out by means of aqua regia (a mixture of nitric acid+hydrochloric acid). The other noble metals present in the ore are then extracted separately by various fusion techniques, after which they can be dissolved. The aqua regia containing the gold, platinum and palladium is evaporated, whereby said metals are converted to their chlorides. Subsequently this mixture of noble metal chlorides is commonly separated in industry by a series of steps, as follows:

Pt is first removed by precipitation with ammonium chloride. Au is then reduced with iron(II) sulfate to its metallic state. Finally, Pd is oxidized at 80° C. with nitric acid to the +4 oxidation state and precipitated with ammonium chloride. The entire process is lengthy, costly, and complicated and, since it takes place in the presence of base metals, there is usually need for additional—and usually energy-intensive—refining steps to improve the purity of the noble metals obtained.

Another method that has been proposed is an attempt to utilize chromatographic principles. It makes use of the selective adsorption of the complex chlorides of the PGMs when, dissolved in a suitable solvent system, viz. an acidified ketone, they are in contact with an adsorbent cellulose powder present in a column. The method further involves control of the oxidation numbers of the PGMs concerned by adding reducing and oxidizing agents as required. While the separation of macro-amounts of Pt, Pd, Ir and Rh, is claimed to be possible with the method described, it has not as yet found any known industrial application due to the difficulties involved in maintaining all conditions at their proper level and to the toxicity and relatively high cost of many of the materials involved.

Another source of mixtures of the noble metals in solution, which can be recovered, is provided by spent catalytsts from various processes, spent electroplating solutions, anode slimes from various electrochemical processes, etc.

In the last twenty years the technique of gel permeation chromatography has developed into a tool for the separation of biological macromolecules and the determination of their molecular weight. Later on, the separation was described (Analytica Chimica Acta, 126, 1981 p. 229-32) of simple inorganic anions such as halides, nitrates, chlorates etc. using certain cross-linked gels such as Sephadex and Biogel. The mechanism of separation in this case is based on selective adsorption or desorption, being completely different from steric exclusion which exists in the case of the macromolecules. This was explained by the size of the inorganic salt molecules which is smaller than the gel pores. Although the above theoretical review illustrates various aspects for separating hydrophilic anions, no conclusions whatsoever could be deduced relating to the use of this technique for noble metals interseparation.

SUMMARY OF THE INVENTION

It is accordingly an object of the present invention to provide a method for the interseparation of the platinum-group metals and gold in a pure state and their separation from base metals when present in an acid solution, which accomplishes the task in one pass. It is a further object of the invention to provide a method involving non-toxic eluants.

It is yet another object of the invention to provide a method involving common, low-priced eluants.

It is an additional object of the invention to provide a method with modest energy requirements.

It is a final object of the invention to provide a method that is carried out at room temperature.

DETAILED DESCRIPTION OF THE INVENTION

Figure 1:
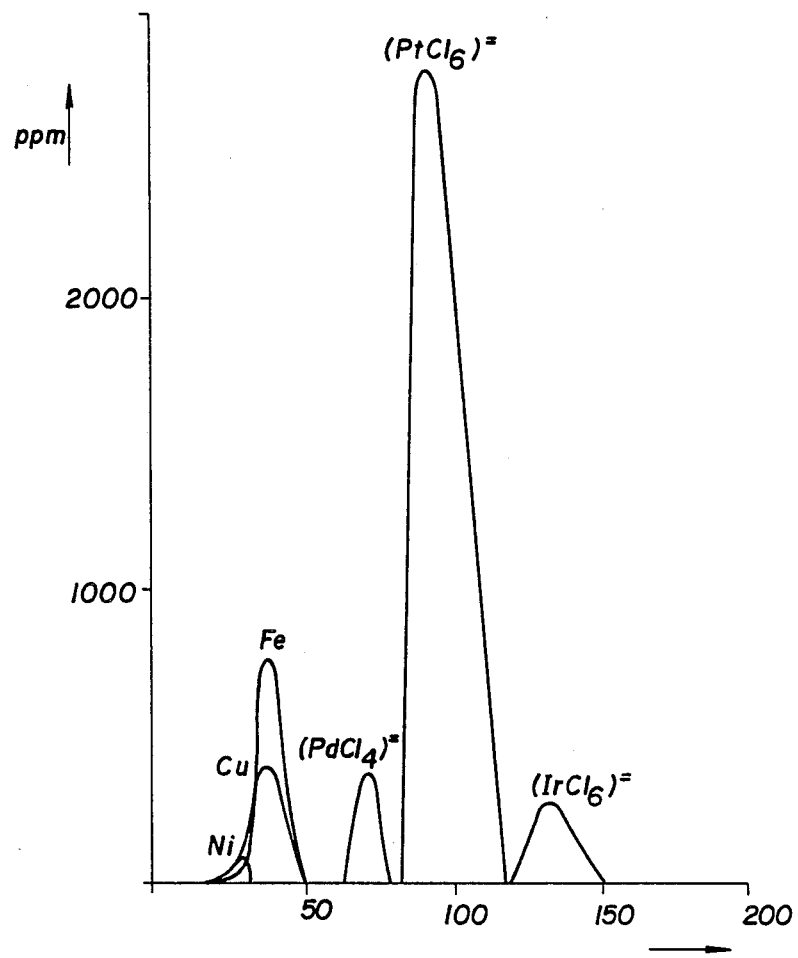
FIG. 1 is a graph of the analysis of Pd, Pt, Ir and base metals in accordance with Example 1.

The invention relates to a method for the interseparation of noble metals from a gold-free halide solution containing at least two noble (PGMs), wherein said solution is passed through at least one chromatographic column containing a solid adsorbent with a "distribution coefficient" Kd, above 1, which adsorbs the PGMs, and subsequently the loaded adsorbent is eluted by a halide salt solution, obtaining thereby well spaced fractions, each containing only one single noble metal and emerging in the order: Ru, Rh, Pd, Pt, Ir and Os. In this manner the noble metals are interseparated in a very pure state with very great efficiency.

According to a preferred embodiment the feed solution consists of PGM chlorides in hydrochloric acid in an overall concentration of 5 g/l. Preferably, the eluant comprises a halide salt together with a mineral acid, the latter being most preferably hydrochloric acid.

In case gold is also present with the noble metals, it should be removed prior to the noble metals (PGMs) adsorption operation. It was unexpectedly found that gold does not migrate through the adsorbent, being held up at the top of the column. The removal of gold may be carried out in any manner known to the art. According to a most preferred embodiment, the gold separation according to the present invention is carried out in the same apparatus, which consists of at least two chromatographic columns connected in series. The first column contains an absorbent only for gold and the second column one for the other noble metals. In this manner, the gold-free solution containing the noble metals will pass onto the second chromastographic column, wherein an inter-separation thereof occurs as described above. A most preferred adsorbent for gold is polystyrene divinyl resin (sold on the market under the Trade Mark Ambrelite XAD-7, produced by Rhom and Haas) in the water-swollen condition.

The solid adsorbents to be used in the present invention are selected from chromatographic reagents used for gel permeation but should possess a chromatographic coefficient of at least 1 and preferably above 4. Typical examples of suitable adsorbents are gels of polysaccharide of the polydextran type (known on the market by their Trade Mark Sephadex) and crosslinked polyacrylamide gel (known on the market by its Trade Mark Biogel). The degree of crosslinking controls the porosity and ability to swell in a solution: the higher the crosslinking, the smaller pores and the lower the swelling. There are several types of Sephadex adsorbent gels, such as: Sephadex G-10, Sephadex G-15, Sephadex G-25 and Sephadex G-50. The numbers of the gels indicate their porosity. The higher the number, the bigger the pores and the faster does migration take place, but then the lower is the resolution of the different PGMs. The kind of Sephadex actually chosen will therefore depend on considerations affecting the specific industrial or other application of the method according to the present invention. The adsorption of the dissolved noble metal components onto the dextran gel is explained by the generation of hydrogen bonds with the hydroxyl groups present in the gel. Also, the high hydrophilic property of the dextran imparted by the OH groups makes it most suitable for the present invention.

The interseparation between the noble metals is quite unexpected in view of the weak bonding of Pt to the gel. The Inventor explains the matter by the polarizability of the metal halide bond which influences the hydrogen bond of the gel and enables the noble metals to be selectively separated. In the case of Biogel the interseparation is based on the electcrostatic interactions of PGM complexes with the amide group of the gel, which are electrostatic and depend on the ion charge. In the case of Sephadex, the interactions of the complexes are of a bipolar type, being weaker than those of the electrostatic type but more selective.

The retention times of the platinum metals on the Sephadex gel are in the following order:

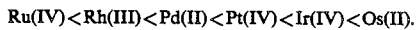

This order was determined by means of the adsorption of each of the metals to the gel in accordance with its interaction with the gel.

The high selectivity of the gel adsorbents according to the present invention for the platinum metals enables good separation to be obtained without the need for establishing any selective conditions for each of the metals to be separated, as is usually the case in these separations with ion exchangers.

It was found that the adsorption of the anionic complexes of the PGMs are bound to the gel more strongly than their counter cations.

One of the advantages of the method are the relatively high concentrations of the PGMs which can be processed. This, of course, is of great importance from the economic point of view.

While the invention will now be described in connection with certain preferred embodiments in the following Examples, it will be understood that it is not intended to limit the invention to these particular embodiments. On the contrary, it is intended to cover all alternatives, modifications and equivalents as may be included within the scope of the invention as defined by the appended Claims. Thus, the following Examples which include preferred embodiments will serve to illustrate the practice of this invention, it being understood that the particulars described are by way of example and for purposes of illustrative discussion of preferred embodiments of the present invention without being limited thereto.

EXAMPLE 1

This Example describes the separation of the four noble metals: gold, platinum, iridium and palladium, from base metals when all are dissolved in an acidic solution, and the subsequent interseparation of the noble metals from each other by the method of the invention.

2 ml of an acidic solution comprising: 3.12 mg/ml Au, 24.2 mg/l Pt, 2.08 mg/ml Ir, 1.33 mg/ml Pd, 2,8 mg/ml Cu, 3.3 mg/ml Fe and 0.4 mg/ml Ni, all dissolved in 2N HCl, were used in the experiment.

The solution was first introduced into a vertical column (inner diameter 10 mm, length 250 mm) filled with the polymeric adsorbent resin Amberlite XAD-7 (Trade Mark, produced by Rohm and Haas) in the water-swollen condition. The depth of the resin bed was 15 cm, and the flow rate at which the solution was made to run through the bed was 1 ml/min. After the entire quantity of the solution had been introduced into the resin bed, partly replacing the water held therein, a solution of 1N HCl was introduced at the flow-rate stated before until the entire quantity of the solution had been washed out. The brown-coloured mixture thereupon emerging, as well as a quantity of the HCl washing solution immediately following, were analyzed and tested for the presence of gold, but no traces thereof could be detected in any of them. The emerging mixture was also analyzed for the presence of Pt and Pd, and it was found that there had been no less of these elements to the resin phase, since they were completely present in the mixture analyzed.

The gold was then eluted from the XAD-7 resin by passing an eluant mixture of acetone and concentrated HCl (in the volume ratio of 9:1) through the column, replacing the 1N HCl solution present therein. It was found that the entire quantity of 6.24 mg gold originally present in the first solution was collected in 25 ml of the eluent, so that there were no losses to the resin phase. Metallic gold was recovered from the eluant by adding a reducing agent —FeSO$_4$ in one experiment, hydroquinone in another—and distilling away the acetone and the HCl.

The remaining solution was introduced into a second chromatographic column (inner diameter 10 mm, length 300 mm), containing the water-swollen polydextran gel (known under its Trade Mark name of Sephadex G-10) to a bed-depth of 25 cm. The flow-rate maintained was 0.5 ml/min. After the solution had been fully adsorbed on the gel, elution was commenced by adding 1N HCl as eluting agent. A fraction collector was adjusted to collect 5-ml fractions of the liquid emerging from the column, and each such fraction was analyzed by atomic absorption sepectroscopy for the presence of Pd, Pt, Ir and base metals. The first five fractions (each 5 ml) were discarded, since they did not contain any traces of metal ions whatsoever, whereas the subsequent fractions emerging from the column, produced the analysis shown in the graph of FIG. 1. As appears from the Figure there is a noticeabls time-gap between the emergence of the solution fraction containing the base metals and those containing the PGMs. In the time-gap, a colourless HCl solution left the column. Following this, a fraction of a yellowish hue emerged which upon examination was found exclusively to contain Pd. After the cessation of the flow of Pd solution, a large fraction containing only Pt appeared, and this in turn was followed by the metal most strongly on the gel, namely Ir, in a dark brown solution. The separation between the four groups—base metals, Pd, Pt and Ir—is seen to be complete, as indicated by the well-spaced peaks and the negligible overlap of the bottom portions.

Distribution coefficients, indicative of the degree of resolution achieved, were calculated and are listed in the following Table 1.

TABLE 1

Exerimental distritution coefficients calculated from consecutive elution volumes.

| Compound | Concentration (gl) | Elution volume (ml) | Distribution Coefficient $K_d$ |
| --- | --- | --- | --- |
| $NiCl_2$ | 0.41 | 28.80 | 1.41 |
| $CuCl_2$ | 2.82 | 36.70 | 2.32 |
| $FeCl_3$ | 3.32 | 36.70 | 2.32 |
| $[PdCl_4]$ | 1.33 | 70.95 | 6.26 |
| $[PtCl_6]$ | 25.15 | 93.95 | 8.79 |
| $[IrCl_6]$ | 2.08 | 1.33 | 13.32 |

EXAMPLE 2

Figure 2:
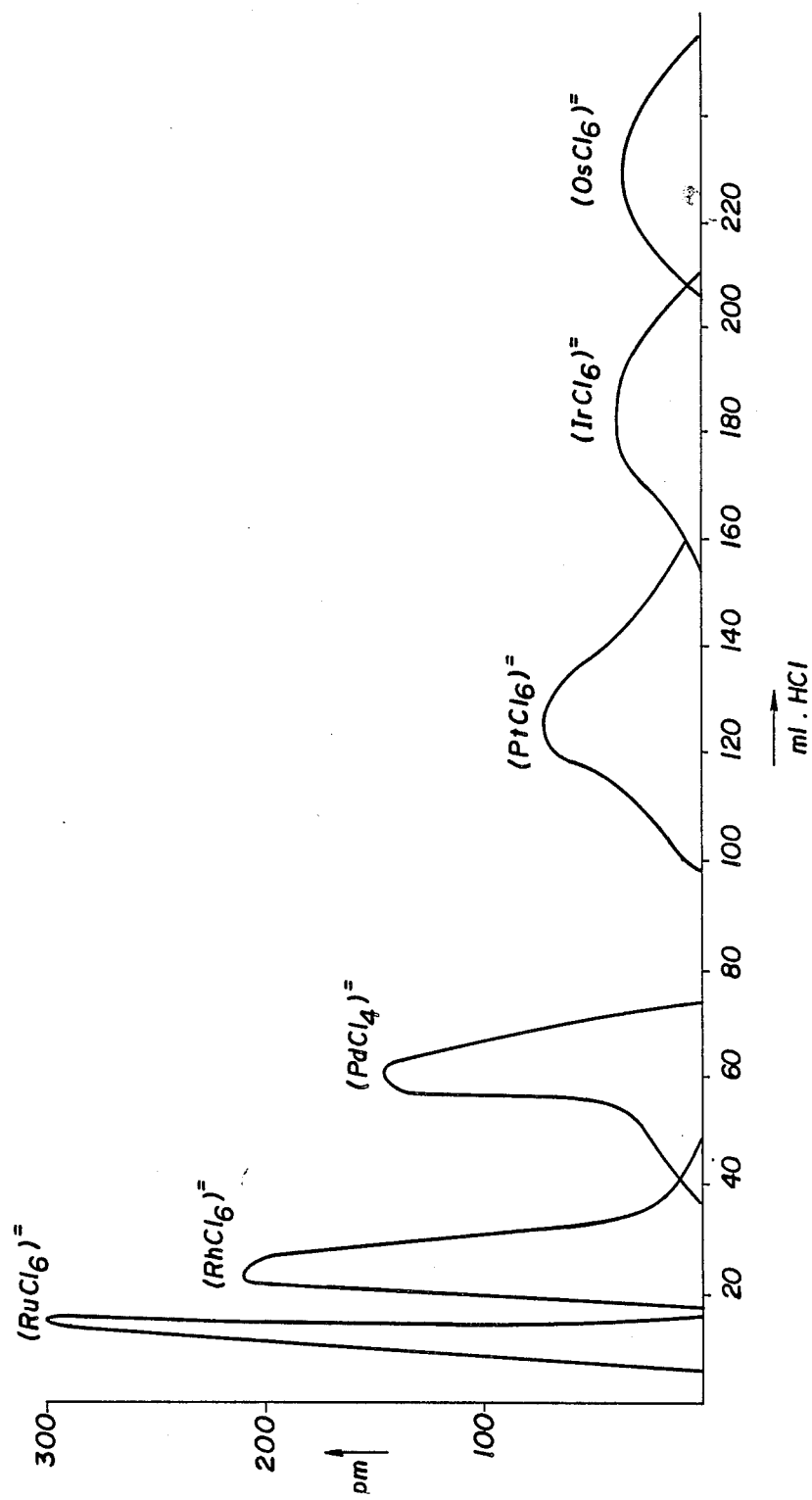
FIG. 2 is a graph of the separation of six platinum group metal ions in accordance with Example 2.

For this Experiment a mixture was prepared of 6 1-ml portion of 1N HCl, each containing 1.88 mg of, in turn, ammonium hexa-chloro-ruthenate, ammonium hexa-chloro-rhodate, ammonium hexa-chloro-iridate, ammonium-hexa-chloro-osmate, ammonium tetra-chloro-palladate, and potassium hexa-chloro-platinate. This solution was introduced into a column equal to the one described as the second chromatographic column in Example 1, and the same elution procedure described therein was again used. The metal ions emerged separately from the column, in a pure state and in the following order: Rh, Pd, Pt, Ir, Os. FIG. 2 is the chromatogram representing the concentration peaks measured. The following Table 2 lists the distribution coefficients calculated from the chromatogram.

TABLE 2

Experimental distribution coefficients calculated from consecutive elution volumes

| Compound | Concentration (g/l) | Elution volume (ml) | Distribution Coefficient $(K_d)$ |
| --- | --- | --- | --- |
| $[RuCl_6]^=$ | 0.313 | 14.50 | 0.33 |
| $[RhCl_6]^=$ | 0.313 | 21.95 | 1.53 |
| $[PdCl_4]^=$ | 0.313 | 58.45 | 7.21 |
| $[PtCl_6]^=$ | 0.313 | 126.45 | 17.76 |
| $[IrCl_6]^=$ | 0.313 | 188.85 | 27.31 |
| $[OaCl_6]^=$ | 0.313 | 223.60 | 31.04 |

In the two Examples given about the chromatographic separation of the platinum metals from one another was carried out with the gel known as Sephadex G-10, because it was found to give the best resolution of the chromatographic peaks, although flow rates with this gel have to be kept low. Similar separations were made with gels of identical chemical structure but bigger pore sizes, respectively known as Sephadex G-15, G-25, and G-50. The choice of the particular gel will depend on the ratio between the components of the metal ion mixture and the extent of the peak resolution required.

The second Example, which deals with the interseparation of all the metals in the platinum group, shows that the method described is indeed suitable for any combination of these metals.

EXAMPLE 3

This Example describes the separation of gold from a mixture also containing platinum and palladium as well as base metals, and the subsequent separation of the base metals followed by the interseparation of Pt and Pd.

An amount of 60 ml of a solution comprising 36.7 mg/ml platinum, 1.15 mg/ml palladium, 3.12 mg/ml gold, 1.25 mg/ml nickel, 3.16 mg/ml copper, and 0.67 mg/ml chrome, all dissolved in 2N HCl, were used in the Experiment.

Gold was adsorbed in, and totally eluted from, the first column as described in Example 1.

Figure 3:
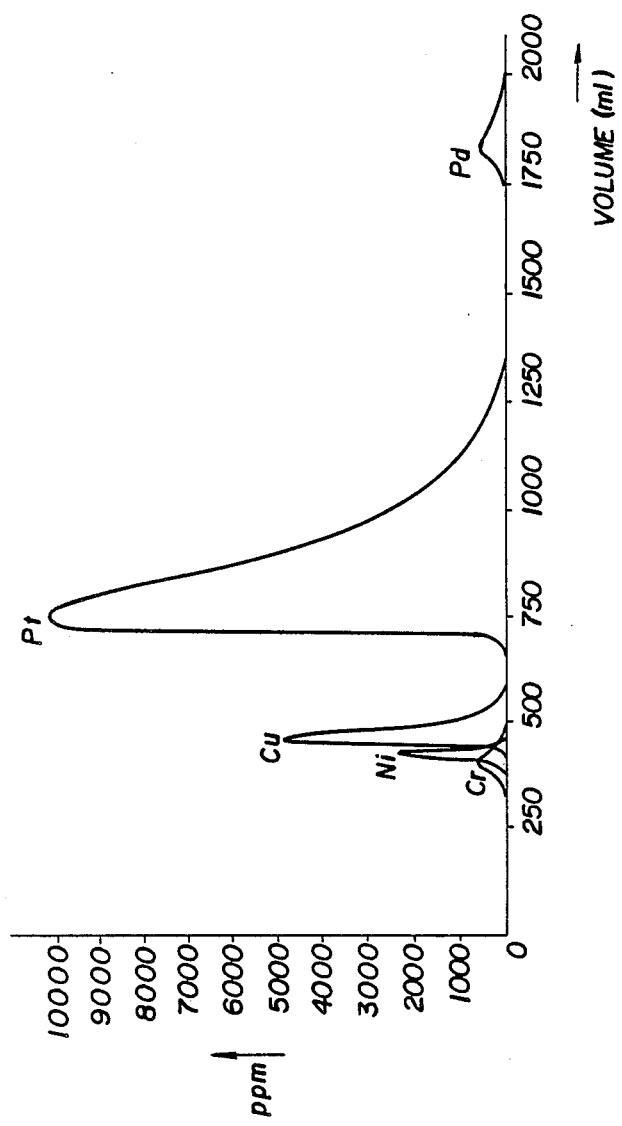
FIG. 3 is a chromatogram of Cr, Ni, Cu, Pt and Pd in accordance with Example 3.

The mixture emerging from the first column while gold was being adsorbed therein, was introduced into the second chromatographic column (inner diameter 29 mm, length 600 mm) filled to a bed-depth of 54 cm with the polyacrylamide gel (Trade Mark Biogel) at a flow rate of 2.5 ml/min. As the mixture, the colour of which was dark brown, was passing through the column, the differential migration of the different metal ions in it was made manifest by the formation of a set of five clearly defined band of different colours (starting from the bottom of the column: electric blue, green, light blue, dark brown, orange-brown) along the gel. Wnen the whole of the mixture had been absorbed on the gel, elution was commenced with an eluant consisting of 1N $HNO_3$ and 0.01N HCl. Fractions of 10 mls of the emerging liquid were collected, and each was analyzed for the presence of all six elements that had been dissolved in the original mixture. No traces of gold were found in any of the fractions, while the other elements, in a substantially pure state, emerged in the manner illustrated in the chromatogram as given in FIG. 3 until 1300 ml had been collected. At that point the eluant was changed to 1N HCl, since experience had shown that in this manner palladium elution is accelerated and the peak on the chromatogram sharpened.

What is claimed is:

1. A method for the interseparation of platinum-group metals from a gold-free halide solution containing at least two noble metals (PGMs), comprising passing said solution through at least one chromatographic column containing a solid adsorbent with a Kd above 1, which adsorbs the PGMs, and subsequently eluting the loaded adsorbent by a halide salt solution, to obtain thereby separate fractions, each fraction containing only one single noble metal and coming out in the order: Ru, Rh, Pd, Pt, Ir and Cs.

2. A method according to claim 1, wherein hydrochloric acid is present in the entering solution.

3. A method according to claim 1, wherein the total concentration of the noble metals is above 5 g/l.

4. A method according to claim 1, wherein the eluent consists of hydrochloric acid.

5. A method according to claim 1, wherein the solid adsorbent is selected from chromatographic reagents used in gel chromatography and possessing a chromatographic distribution coefficient of above 4.

6. A method according to claim 5, wherein said solid adsorbents are selected from polysaccharide gels of the polydextran type and crosslinked polyacrylamide gels.

7. A method according to claim 1, wherein the metals are separated in a substantially pure state.

8. A method for the separation of noble metals from a halide solution containing gold and at least two noble metals (PGMs), comprising passing said solution through at least two chromatographic columns connected in series, the first column containing an adsorbent based on polystyrene divinyl whereon gold is adsorbed and from which it is subsequently eluted by a solution of acetone and hydrochloric acid, the second column containing a solid adsorbent selected from gels of polydextran or cross-linked polyacrylamide on which the PGMs are adsorbed, and from which the PGMs are eluted by a halide solution containing hydrochloric acid thereby to obtain separate fractions, each fraction containing one single noble metal going out in the order: Ru, Rh, Pd, Pt, Ir and Cs.

9. A method according to claim 8, wherein the metals are separated in a substantially pure state.

* * * * *